United States Patent [19]

Auslander et al.

[11] Patent Number: 4,642,764

[45] Date of Patent: Feb. 10, 1987

[54] METHOD OF DEVELOPING FORMAL IDENTITIES AND PROGRAM BASES IN AN OPTIMIZING COMPILER

[75] Inventors: Marc A. Auslander, Millwood; Martin E. Hopkins, Chappaqua; Peter W. Markstein, Yorktown Heights, all of N.Y.

[73] Assignee: International Business Machines Corporation, Armonk, N.Y.

[21] Appl. No.: 640,285

[22] Filed: Aug. 13, 1984

[51] Int. Cl.⁴ .............................................. G06F 9/44
[52] U.S. Cl. ................................................... 364/300
[58] Field of Search ....................................... 364/300

[56] References Cited

U.S. PATENT DOCUMENTS 4,567,574  1/1986  Saade et al. .................... 364/300 X

*Primary Examiner*—Raulfe B. Zache
*Attorney, Agent, or Firm*—Roy R. Schlemmer

[57] ABSTRACT

A method operable within an optimizing compiler for generating Basis items and Kill Sets for use during subsequent global common subexpressions elimination and code motion procedures. More particularly, the method comprises assigning a symbolic register to each non-basis element to be computed as follows: creating a tuple (v) for each computation which is to be converted to a machine instruction by the compiler creating a table (optimally, a hash table) having an entry for all the tuples in the program being compiled; for every Basis element in a tuple being entered in the table a symbolic register uniquely assigned to that tuple is added to the Kill Set for that Basis element. For every non-basis element "n" in the tuple being entered into the table, the uniquely assigned symbolic register for that tuple is added to the Kill Sets for all the Basis elements in whose Kill Sets that non-basis element "n" appears. The symbolic register assigned to the tuple in the table is chosen to total the result of the computation of the non-basis element; and finally, a second table is constructed so that given a symbolic register, the computation which it represents can be retrieved.

6 Claims, 4 Drawing Figures

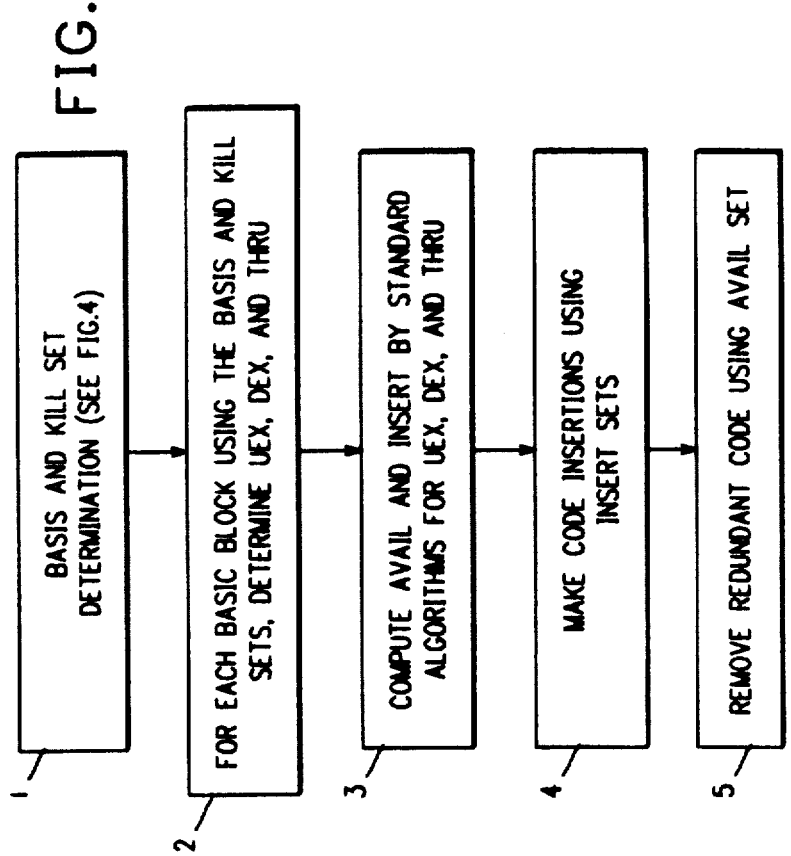

METHOD OF DEVELOPING FORMAL IDENTITIES AND PROGRAM BASES IN AN OPTIMIZING COMPILER

TECHNICAL FIELD

The present invention has particular utility in a compiler in which optimization algorithms are used to improve the quality of the code. In particular, when the concept of a 'Basis' item as taught in co-pending application Ser. No. 640,283 is employed for global common subexpression elimination and code motion, this invention comprises an optimal method for establishing the 'Basis' during the intermediate code generation process.

While this invention will find utility in optimizing compilers for all types of computers, it has particular significance for reduced instruction set computers, for which the code produced by compilers is often more voluminous than code produced for complex instruction set computers, because each instruction of a reduced instruction set computer is simpler and performs less function. There is more opportunity and need for optimization in code produced for a reduced instruction set computer.

BACKGROUND OF THE INVENTION

The quality of code produced by compilers has been an issue ever since the first compiler was produced. One of the principal objectives of IBM's FORTRAN I compiler, the first commercially available compiler, was to produce object code in the field of scientific computation which was comparable in code quality to that produced by assembly language programmers.

Today, higher level languages are designed to be used in every field in which computers are applicable. Even the original FORTRAN language has been bolstered to make it applicable to a wide range of programming tasks. However, it is still important that the quality of code produced by the compiler be high, especially if the resultant code is to be used in a production environment. Code produced by a skilled assembly language programmer is still the yardstick against which compiler produced code is measured.

A large number of optimization techniques have been developed and refined since the 1950's to improve the quality of compiler generated code. Indeed, many of these optimizations were known in principle, and used in some fashion by the team that produced the first FORTRAN compiler.

Optimizations that are frequently employed in optimizing compilers include common subexpression elimination, moving code from regions of high execution frequency to regions of low execution frequency (code motion), dead code elimination, reduction in strength (replacing a slow operation by an equivalent fast operation), and constant propagation. Descriptions of these optimizations can be found in:

J. T. Schwartz, *On Programming—An Interim Report on the SETL Language. Installment II: The SETL Language and Examples of Its Use.* Courant Institute of Mathematical Sciences, NYU 1973, pp. 293-310.

E. Morel and C. Renvoise, *Global Optimization by Suppression of Partial Redundancies,* CACM Vol. 22, No. 2, pp 96-103, 1079.

A. Aho, J. Ullman, *Principles of Compiler Design,* Addison-Wesley, 1977.

Global common subexpression elimination and code motion are among the most important optimizations. Measurements have shown that these optimizations have a larger effect on code improvement than any of the other optimizations. Many articles in the literature discuss how to perform this optimization; the first two of the above citations contain excellent accounts of how to determine where in a program, copy of code should be inserted in order to allow original code to become redundant and subject to elimination. These articles also describe how to determine where redundant code exists. The methods depend on the program's flow graph, and a knowledge of certain properties which can be determined by examining basic blocks one at a time. These properties are:

DEX: (downward exposed expressions). The set of computations which if executed at the end of a basic block give the same result as when executed "in place", i.e. where they occur in the basic block.

UEX: (upward exposed expressions). The set of computations which if executed at the beginning of a basic block give the same result as when executed "in place".

THRU: (unaffected computations) The set of computations which if computed at the beginning or end of the basic block would give the same results.

The above mentioned references describe how to perform global common subexpression elimination and code motion on the premise that the above mentioned sets are known for every basic block. In particular, these references describe how to compute the set of computations already available on entry to a basic block, and the set of computations to be inserted at the end of certain basic blocks to achieve the effect of code motion, based on the sets DEX, UEX, and THRU. These computations are well known to those skilled in the art.

Unless care is taken in computing UEX, DEX, and THRU, the commoning and code motion algorithms known in the prior art may only common and/or move the first of a sequence of related computations. For example, consider the code fragment in Table 1:

TABLE I

L R100,A: Fetch contents of A into register 100

L R101,B: Fetch contents of B into register 101

Add R102,R100,R101: Set Reg. 102 to the sum of contents of A and B

St R102,C Set contents of C to the contents of R102

It is easy not to put the computation of R102 into UEX for a basic block consisting of the code in Table 1 because R100 and R101 may not have the same values on entering the basic block as they do when the Add instruction is encountered. Thus, if Table 1 is code in an inner loop in which A and B are unchanged, only R100 and R101 would obviously belong in UEX (which is the instrumental set in determining code motion). Then after applying commoning and code motion, the computation of R102 still remains in the loop, and another application of the algorithm would be required to move the computation of R102 out of the loop.

PRIOR ART

U.S. Pat. No. 4,309,756 discloses a method for evaluating certain logical computations. The disclosed concepts are narrow in scope and anachronistic for a patent issued in 1982. It is primarily background art in that it sheds no light on naming computations so that potentially redundant computations are given the same name.

U.K. Pat. No. 1,413,938 is concerned with techniques for testing compiler output for correctness. It could be used to test the correctness of code generated by an optimizing compiler. However, it bears no relevance to how the optimizing compiler generates code in general, or how it achieves its optimizations.

U.S. Pat. No. 4,277,826 uses hashing to maintain a virtual address translation mechanism. The present invention uses hashing to quickly reference computations previously encountered in the compilation process. However, hashing is a minor detail in the embodiment of our invention.

Copending application Ser. No. 640,283, entitled "A Method for Improving Global Common Subexpression Elimination and Code Motion in an Optimizing Compiler" teaches how to avoid the difficulties in optimizing the code in Table 1, by introducing the concept of a determination of Basis for computations. From the Basis the other sets of data required for commoning and code motion can then be derived in a manner which will allow the standard global commoning and code motion to exploit all opportunities for code improvement in only one application.

The present disclosure teaches how a computation Basis can be established easily during parsing and intermediate language code generation. It also shows how to assign symbolic registers to non-basis items in such a manner that computations which are potentially redundant are assigned to the same symbolic register.

The PL/1L compiler, which is discussed in Cocke, J. and Markstein, P., *Measurement of Program Improvement Alogrithms*, Proc. IFIP Cong. '80, Tokyo, Japan Oct. 6–9, 1980, Melbourne Australia Oct. 14–17, 1980, pp. 221–228, uses but does not disclose the concept of determining a "Basis" element on the fly during intermediate language code generation.

SUMMARY OF THE INVENTION

It is a primary object of the present invention to provide an optimizing compiler in which the Basis for computations, as defined in co-pending application Ser. No. 640,283, can be determined during the parsing and intermediate language code generation process.

It is a further object of this invention to introduce the concept of a *formal identity* for a non-basis computation.

It is a further object of this invention to assign names to non-basis computations (i.e. to the formal identity which represents the non-basis computation) so that the same computation performed on Basis elements is always given the same name. In this manner, computations which are candidates for common subexpression elimination are given the same name. Names of non-basis computations are called symbolic registers in the present description.

It is a further object of this invention to derive the formal identity or symbolic register for a tuple consisting of an operator and a string of operands.

It is yet another object of this invention to compute the "kill sets", which for each basis element are the non-basis computations (or symbolic registers) which depend on the value of the basis element.

The objects of the present invention are accomplished in general by a method operable within an optimizing compiler for generating Basis items for Kill Sets for use during subsequent global common subexpressions eliminating code motion procedures. More particularly, the method comprises assigning a symbolic register to each non-basis element to be computed as follows: creating a tuple (v) for each computation which is to be compiled to a machine instruction by the compiler, a table (optimally, a hash table) is created for all the tuples in the program being compiled; for every Basis element in a tuple being entered in the table, a symbolic register uniquely assigned to that tuple is added to the Kill Set for that Basis element; for every non-basis element "n" in the tuple being entered into the table, the uniquely assigned symbolic register for that tuple is added to the Kill Sets for all the Basis elements in whose Kill Sets that non-basis element "n" appears; the symbolic register assigned to the tuple in the table is chosen to hold the result of the computation of the non-basis element; and finally, a second table is constructed so that a given symbolic register, and then the computation which it represents can be retrieved.

BRIEF DESCRIPTION OF THE DRAWINGS

FIG. 3 is a high level flowchart of the global common subexpression and code motion algorithm which is used in an optimizing compiler, and in which the present invention has utility.

In the drawing, like elements are designated with similar reference numbers, and identical elements in different specific embodiments are designated by identical reference numbers.

DISCLOSURE OF THE INVENTION

Figure 2:
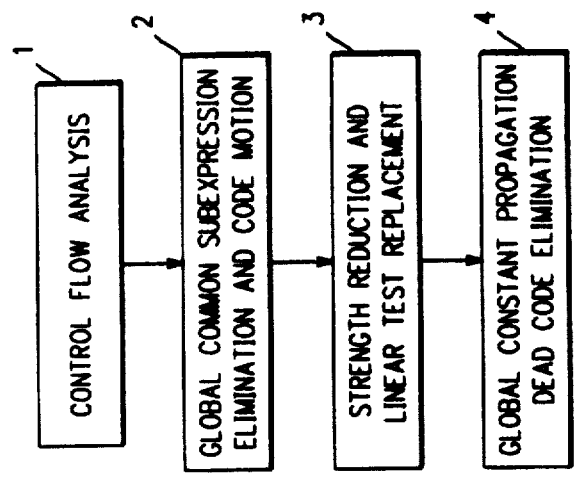
FIG. 2 is a high level flowchart of the optimizing phase of an optimizing compiler in which the present invention has utility.

The present invention provides a method by which the "Basis" for the computations in a program being compiled, and the "Kill Sets" for the basis items, can be determined during parsing and code generation time. This invention makes it unnecessary to determine the Basis and Kill Sets by later analyzing a program produced by the early phases of a compiler.

The following is a bit of definition of a number of terms used in the description of the present invention. These definitions are coextensive with the definitions of the same types as used in copending application Ser. No. 640,283.

BASIC BLOCK—A set of instructions which can only be entered from outside the set via the first instruction. Each instruction in the basic block except the last has exactly one successor and that successor is in the basic block. This is also called straight line code.

INTERMEDIATE LANGUAGE—is one used by the compiler to represent the program being translated. It is usually at a lower level than the source language and a higher level than the target language. Optimizing compilers transform intermediate language programs into equivalent, but better, intermediate language programs.

BASIS—The basis for each basic block comprises items which are used as operands without having previously been defined within that basic block. The collection of such items over all basic blocks is called the "Basis" for the program.

NON-BASIS—Conversely, a non-basis item is an operand which *has* been previously defined in that basic block before being used.

KILL SET—For each member of the basis, the set of non-basis items which depends on it is called the kill set of the basis element. Note that if a basis element has its value changed (by virtue of being recomputed), all members of its kill set would receive different values if recomputed thereafter.

To continue with the present description, take the following items as a computational basis:

1. All user variables and all descriptors of user variables.
2. Pointers to run time stacks and heaps in which data objects are allocated.
3. Pointers to object code.
4. Destinguished compiler generated temporaries which capture the value of an expression at the time the expression is computed. (Such temporaries do not change their values even if operands which were used to compute the temporaries change their value later.

For example, to translate do i=a to b to c;

in many languages, the induction variable increment c is fixed at the time the loop is entered. Even if c changes within the loop, the semantics of such languages require that the increment be the value which c had at the time the loop was entered. That initial value of c is kept in a distinguished temporary.

Thus, basis elements can be determined as they are encountered, either because the use of a user variable was encountered, or a declaration of a user variable was encountered, or a user variable requires a descriptor at execution time, or references are made to heaps or stacks belonging to the run-time environment, or the compiler must generate a distinguished temporary, or the compiler must make reference to object code (i.e. a branch instruction).

Whenever a non-basis element is computed, it is assigned to a symbolic register as follows:

1. A Tuple consisting of the operation code and the operands used to compute the non-basis element is constructed.
2. A table, usually best implemented as a hash table, is searched for an occurance of this tuple.
   a. If the tuple is not found, it is entered into the table, and an unassigned symbolic register is assigned to the table entry. Therefore, the tuple can now be found in the table.
   b. For every Basis element in the tuple being entered into the table, add the assigned symbolic register to the Kill Set for the Basis element.
   c. For every non-basis element n in the tuple being entered into the table, add the assigned symbolic register to the Kill Set for all the Basis elements in whose Kill Sets that non-basis element n appears.
3. The symbolic register assigned to the tuple in the table is chosen to hold the result of the computation of the non-basis element.
4. A second table can be constructed so that given a symbolic register, the computation which it represents can be retrieved.

Thus the present invention causes two convenient tables or maps to be set up: one map (best implemented as a hash table) which goes from tuples that describe operations to symbolic registers, and a second, from symbolic registers to the tuple that defines the operation.

The symbolic registers can be viewed as "formal identities" for the computations on Basis elements. By the above construction of the symbolic registers, each symbolic register represents a unique computation using Basis elements as operands. Each symbolic register becomes a member of the Kill Set for each Basis element in the computation it represents.

Because of the manner in which the symbolic registers were constructed from the Basis, they always represent the same computation, independent of where the symbolic registers are computed in the program. Thus they are natural objects for global common subexpression elimination and code motion.

Figure 1:
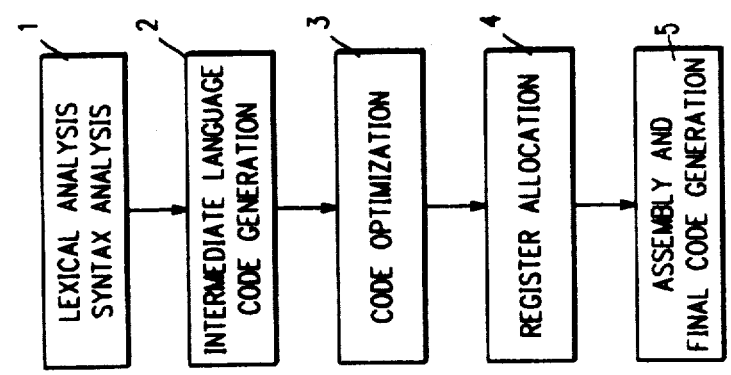
FIG. 1 is a very high level functional flowchart of an optimizing compiler in which the present invention has utility.

The figures which comprise the flowcharts of the present invention are largely self-explanatory. FIG. 1 is a very high level flowchart for a compiler as is well known in the art. Blocks 1, 2, 4 and 5 are quite straightforward and well known. Block 3 entitled Code Optimization is the phase of the compiler activity to which the present invention applies.

FIG. 2 is a flowchart of the optimization phase for such an optimizing compiler. The operations performed in Blocks 2, 3 and 4 are straightforward and well known in the art. Block 2 is the area of the optimizing compiler to which the present invention applies. This block is shown in expanded form in FIG. 3.

FIG. 3 is a flowchart for the global commoning and code motion phase of the compiler. As stated previously in the specification, this overall objective is well known in compiler design. The specific manner in which the function is performed is set forth generally in copending application Ser. No. 640,283. In this application the overall compilation procedure as well as the concept of developing Basis and Kill Set Items is discussed and described in detail, as well as the means for using these items to determine UEX, DEX, THRU lists, e.g., Block 2 at FIG. 3.

Also as discussed in the copending application Ser. No. 640,283, the three blocks designated 3, 4 and 5 in FIG. 3 are similarly indicated as being within the prior art and are discussed and described for convenience of reference purposes only. Examples and sample programs for computing AVAIL and INSERT utilizing UEX, DEX, and THRU are set forth.

Figure 4:
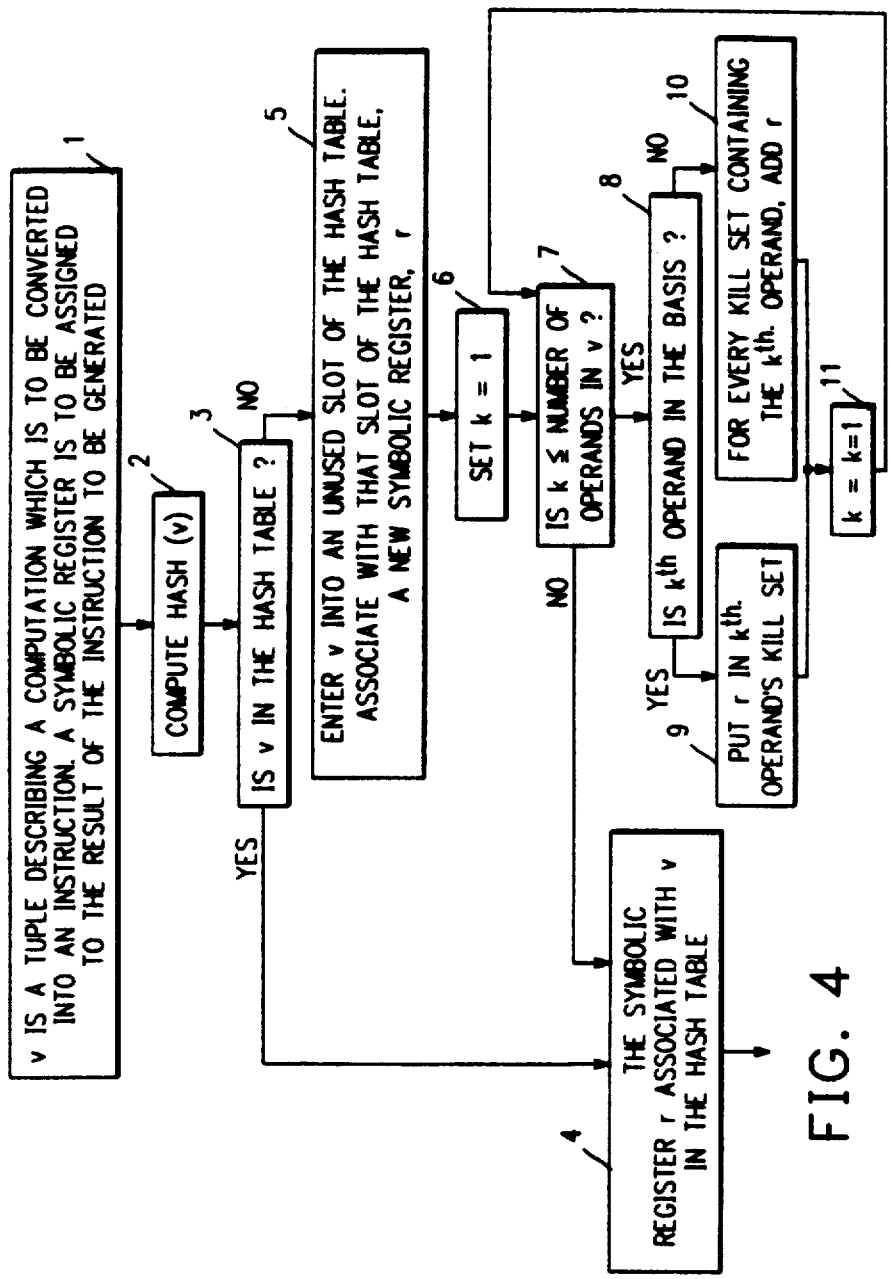
FIG. 4 is a high level flowchart of a routine which converts tuples describing an operation into symbolic registers, and shows how the kill sets are developed.

Thus the particular way in which the Basis and Kill Sets are determined comprise the subject matter of the present invention and as indicated in the figure this method is described in detail in FIG. 4.

FIG. 4, as is apparent, is a flowchart of the details of Block 1 of FIG. 2 in which a list of the Basis items and Kill Sets for the individual basic blocks comprising a particular program are formed.

Block 1 of this figure is in essence merely a definition of the sequence of tuples which are supplied to this phase of the compiler activity in sequence for each basic block.

The first actual procedural step is in Block 2 where the system computes a hash function by some conventional means from the data content of the complete tuple (v). As is well known this hash function is then used as an address into some sort of table or memory and the existence of data at that particular address is tested for in Block 3. If the address in the table contains the tuple v it means that this tuple has been previously processed and the system would proceed to Block 4. This block causes the symbolic register r associated with the tuple v to be returned to the system. Thus, the output of block 4 would be a list of symbolic registers each of which would be intrinsically different if the tuples were different. Obviously, if the tuples were identical the same symbolic register indication would be given.

Assuming that the output from Block 3 is "no," the system would then proceed to Block 5 which causes the particular tuple to be stored at the appropriate address in the hash table and causes a new symbolic register r to be assigned to that tuple and appropriately stored in the hash table at the hash address derived from the tuple. The system then proceeds to Block 6 wherein a parameter k for the tuple is set to a 1. The system then proceeds to Block 7 wherein the current value of the register k is compared against the number of operands in the tuple v. It will be noted in this connection that the number of operands in the particular tuple may be preprocessed and stored in the hash table together with the tuple or may be computed on the fly in Block 7 as will be apparent to those skilled in the art. In any event, if the value k is found to be greater than the number of operands in the tuple, the system will know that it has completely evaluated the tuple and will branch into Block 4, described previously. If, on the other hand, an "equality" or "less than" condition exists, the flow continues to Block 8.

In Block 8 a test is made to see if the specific kth operand is in the list of Basis items, which list of Basis items would have been computed, in Block 1 of FIG. 3. The Basis list may be easily derived from the intermediate language listing as described previously. If the kth operand is found to be in the Basis the system branches to Block 9 wherein the particular symbolic register r is added to the kth operand's Kill Set. If, on the other hand, the operand had not been in the Basis, the system would proceed to Block 10 wherein the list of Kill Sets is examined and for every one containing the kth operand the symbolic register r associated with the present tuple is added. Both the Blocks 9 and 10 proceed to Block 11 which is a control block that increments the value of k to provide an exit to Block 4 when all operands that have been evaluated or to index the system to the next operand for appropriate evaluation.

The above description of FIG. 4 describes the operation of the present invention in a functional manner indicating the manner in which symbolic registers are assigned to the various tuples and the way in which the Kill Sets are progressively built as a particular program sequence is evaluated. The following description of the subprogram for Block 4 is a much more detailed description of the operation of the present invention.

The following PL/1 subprogram shows code which accepts the description of an instruction to compute a non-basis item, and returns the symbolic register which holds the result. The program also constructs the kill sets for each basis item, and constructs a map from which, the instruction represented by a symbolic register can be retrieved.

Details about how certain array sizes are determined, how the arrays are allocated, and how the compiler recovers if the array sizes are too small are not dealt with in this example subprogram, because these issues are orthogonal to this invention. Standard space allocation algorithms, fitting with the compiler's overall storage management philosophy, would be used for these matters.

The following PL/1 subprogram shows code which accepts the description of an instruction to compute a non-basis item, and returns the symbolic register which holds the result. The program also constructs the kill sets for each basis item, and constructs a map from which, the instruction represented by a symbolic register can be retrieved.

Details about how certain array sizes are determined, how the arrays are allocated, and how the compiler recovers if the array sizes are too small are not dealt with in this example subprogram, because these issues are orthogonal to this invention. Standard space allocation algorithms, fitting with the compiler's overall storage management philosophy, would be used for these matters.

Result: proc(v) returns (fixed bin);

/* ************************************** */

/*Inputs:

parameter v: a vector describing the computation of a non-basis element. v(1) is the operation code, and all the other elements of the vector v are operands, either symbolic registers or basis elements.

/* ************************************** */ dcl v(*) fixed bin,  /*vector describing computation*/

1 hash_table (0,*) controlled static external,

/*table for rapid lookup of*/

/*computations of non-basis items*/

2 symbolic_register fixed bin,  /*symbolic register name given to computation*/

2 start_index fixed bin,    /*where to find description of computation*/

2 instruction_size fixed bin, /*length of vector that describes computation*/ kill (*, *) bit controlled external,

/*The ith row corresponds to the ith basis element, and the jth column to the jth non-
-basis item.

kill(i,j) indicates
whether basis item
i is used (directly
or indirectly) to
compute symbolic
register j.*/ operands (*) fixed bin controlled external,
/*A large vector into
which all the
formal identities
are kept. The hash
table indicates
where each identity
begins, and how
long it is.*/ formal_identity (*) fixed bin controlled external,
/*Map from symbolic
registers to hash
table, from which
formal identity can
be found*/ top_of_list fixed bin external, /*next slot in
operands to assign*/ new_symbolic_register fixed bin external,
/*next symbolic regi-
ster to assign*/

```
;
hash = 0;
do i = 1 to hbound(v,1);        /*compute hash of*/
  hash = hash + v(i);           /*computation being*/
  end;                          /*searched.*/ table_size = hbound(hash_table, 1);
start = mod(hash, table_size); /*where to begin search for computation in hash table    */ do i = start repeat mod(i+1, table_size)

until (mod(i+1, table_size) = start);

/*check whether i-th formal identity matches instruction described in vector v.  First, if the i-th slot is empty, nothing has hashed to the i-th slot yet, and so v describes a new computation.*/ if symbolic_register(i) = 0 then go to new_computation

/*Next, the i-th identity must have the same length as the instuction described by v if it is to match.*/ if instruction_size ¬= hbound(v,1) then go to next_i;

/*Finally, each component of v must match each component of the i-th formal identity.*/
```

```
       do k = 1 to hbound(v,1);

j = start_index(i);

if operands(k+j) ¬= v(j) then go to next_i;

end;

return(i);
next_i:

end;

/*If the do loop on i terminates, it means that the hash_table is full.  Give up, or apply a hash table extension procedure.  This code which is orthogonal to this disclosure, is not shown here.

*/
new_computation:

/*Control reaches this point if the computation being searched had never been seen before.

The computation is first entered into the hash table and assigned a symbolic register.

The variable new_symbolic_register contains the next symbolic register number which can be assigned.  The map formal_identity takes a symbolic register to the hash table entry that defines it.  From the hash table, the actual computation that the symbolic register formally represents can be found.

*/ symbolic_register(i) = new_symbolic_register;

formal_identity(symbolic_register(i)) = i;

new_symbolic_register = new_symbolic_register + 1;
```

```
j, start_index(i) = top_of_list;

instruction_size(i) = hbound(v, 1);

top_of_list = top_of list + hbound(v, 1);

/*for this entry in the hash table, indicate where in the computation storage heap a copy of this computation is stored*/ do k = 1 to hbound(v, 1);

operands(k+j) = v(k);   /*copy element*/ if k > 1 then           /*for operands*/ if in_basis(v(k)) then   /*test for basis*/ kill(v(k), symbolic_register(i)) = '1'B;

/*if basis operand, put symbolic register in the kill set for that basis item*/ else      /*if not a basis item, i.e.

the operand is a symbolic register, the symbolic register which receives the result of the computation being analyzed is put every kill list which contains the symbolic register operand v(j).

*/ kill(*, symbolic_register(i)) = kill(*, formal identity(i)) | kill(*, v(k) );

end /*do k = 1 to hbound(v,1)*/;

return(symbolic_register(i));
```

```
in_basis: proc(x) returns(bit);

/*This routine returns true if operand x is in the basis of the program being compiled.  This is dependent on how operands are encoded.  This example is encoded under the assumption that basis items are negative, and non-basis items are positive.  In practice, the encoding will probably be more complex. */ if x < 0 then return(true);

else return(false);

end /*in_basis*/;

end;
```

Thus, while the invention has been described with reference to preferred embodiments thereof, it will be understood by those skilled in the art that various changes in form and details may be made without departing from the scope of the invention.

Having thus described our invention, what we claim as new, and desire to secure by Letters Patent is:

1. A method operable within an optimizing compiler for generating Basis items and Kill Sets for use during subsequent global common subexpression elimination and code motion procedures, said method comprising:
    creating a tuple (v) for each computation which is to be converted to a machine instruction by the compiler,
    creating a table having an entry for all the tuples in the program being compiled, assigning a symbolic register to each tuple created,
    for every Basis item in a tuple being entered in the table adding to the Kill Set for that Basis item, a symbolic register uniquely assigned to that tuple,
    for every non-basis item "n" in the tuple being entered into the table, adding the uniquely assigned symbolic register for that tuple to the Kill Sets for all the Basis items in whose Kill Sets that non-basis item "n" appears,
    designating the symbolic register assigned to the tuple in the table to the result of the computation of the non-basis element, and constructing a second table of assigned symbolic registers whereby the computation to which each symbolic register has been assigned can be readily retrieved.

2. A method operable within an optimizing compiler for generating Basis items and Kill Sets for use during subsequent global common subexpressions elimination and code motion procedures, said method comprising assigning a symbolic register designation to each non-basis items in the program being compiled, whereby the computation to which each symbolic register has been assigned can be readily retrieved.

3. A method operable within an optimizing compiler as set forth in claim 2 including instructing a list for each Basis item comprising:
    all of the symbolic register designations for every non-basis item dependent upon that basis item.

4. A method operable within an optimizing compiler for generating Basis items and Kill Sets for use during subsequent global common subexpression elimination and code motion procedures, said method comprising:

creating a tuple (v) for each computation which is to be converted to a machine instruction by the compiler, creating a hash table having an entry for all the tuples in the program being compiled, assigning a symbolic register to each tuple created, and creating a list of said assigned symbolic registers addressable by register designation containing the tuple to which that symbolic register is assigned.

5. A method operable within an optimizing compiler for use during subsequent global common subexpression elimination and code motion which comprise, evaluating the program and deriving a list of Basis items contained therein, creating a tuple (v) for each computation which is to be converted to a machine instruction by the computer, creating a hash table having an entry for every potential tuple in the program being compiled, as each tuple is generated by the compiler performing the following steps:

(1) computing a hash address for the tuple
(2) determining if an entry already exists for that tuple,
(3) if an entry exists in the hash table (symbolic register designation r) returning r to the system controls
(4) if no entry exists in the hash table for that tuple, assigning a unique symbolic register r to that tuple and storing same at the specific address in the hash table
(5) determining how many operands are in the tuple and processing each as follows:
(6) for each operand, if it is in the Basis storing the symbolic register designation r in that operands Kill Set
(7) if the operand is not in the Basis storing the symbolic register designation is in every Kill Set containing that operand,
(8) returning to step 4 after all operands have been evaluated.

6. A method operable within an optimizing compiler for selecting a 'Basis' without analyzing the program by including the following items into the 'Basis':

all user variables, and all descriptors of user variables,
pointers to run-time stacks and heaps in which data objects are allocated,
pointers to object code,
distinguished compiler generated temporary results.

* * * * *